US008307435B1

(12) United States Patent
Mann et al.

(10) Patent No.: US 8,307,435 B1
(45) Date of Patent: Nov. 6, 2012

(54) SOFTWARE OBJECT CORRUPTION DETECTION

(75) Inventors: Uriel Mann, Oak Park, CA (US); Nishant Doshi, Foster City, CA (US)

(73) Assignee: Symantec Corporation, Mountain View, CA (US)

( * ) Notice: Subject to any disclaimer, the term of this patent is extended or adjusted under 35 U.S.C. 154(b) by 346 days.

(21) Appl. No.: 12/707,970

(22) Filed: Feb. 18, 2010

(51) Int. Cl.
*H04L 29/06* (2006.01)
(52) U.S. Cl. ............. 726/22; 714/7; 714/38.1; 717/124; 717/125; 717/126; 717/127; 717/128; 717/129; 717/130; 717/131; 717/132; 717/133; 717/134; 717/135
(58) Field of Classification Search ............. 726/22; 717/124–135; 714/37, 38.1
See application file for complete search history.

(56) References Cited

U.S. PATENT DOCUMENTS

| 4,821,701 | A | 4/1989 | Nankee, II et al. | |
| 7,930,491 | B1 * | 4/2011 | Xu et al. ......... | 711/154 |
| 2006/0187941 | A1 * | 8/2006 | Andersen ......... | 370/398 |
| 2008/0301646 | A1 * | 12/2008 | Gupta ............. | 717/127 |
| 2010/0205674 | A1 * | 8/2010 | Zorn et al. ....... | 726/25 |

OTHER PUBLICATIONS

Shuo Chen, "Defeating memory corruption attacks via pointer taintedness detection", 2005, University of Illinois at Urbana-Champaign and North Carolina State University.*
Chenette, S. et al., "Detecting Web Browser Heap Corruption Attacks," Websense Security Labs, 25 pages, [Online] [Retrieved on ] Retrieved from the Internet<URL:http://www.blackhat.com/presentations/bh-usa-07/Chenette__and__Joseph/Presentation/bh-usa-07-chenette__and__joseph.pdf>, Jan. 7, 2010.
"EEPROM VPD Corruption Detection and Correction Method," Prior Art Database, IP.com, 2004-2010, 1 page, [Online] [Retrieved on Aug. 10, 2010] Retrieved from the Internet<URL:http://priorartdatabase.com/IPCOM/000175771>.
"Oracle® Database Administrator's Guide: Detecting and Repairing Data Block Corruption," 10g Release 1 (10.1), Oracle Corporation, 2001, 2003, 8 pages [Online] [Retrieved on Aug. 10, 2010] Retrieved from the Internet<URL:http://www.stanford.edu/dept/itss/docs/oracle/10g/server.101/b10739/repair.htm>.
"Oracle® Database Administrator's Guide: Using DBMS__REPAIR to Repair Data Block Corruption," 10g Release 2 (10.2), Oracle Corporation, 2001, 2005, 8 pages [Online] [Retrieved on Aug. 10, 2010] Retrieved from the Internet<http://ftp.youngcow.net/doc/oracle10g/server.102/b14231/repair.htm>.

* cited by examiner

*Primary Examiner* — Jason K. Gee
*Assistant Examiner* — Ayoub Alata
(74) *Attorney, Agent, or Firm* — Fenwick & West LLP

(57) ABSTRACT

The execution of a software application is diverted to detect software object corruption in the software application. Software objects used by the software application are identified and their pointers are inspected. One or more tests are applied to pointers pointing to the virtual method tables of the software objects, addresses (or pointers) in the virtual method tables, and memory attributes or content of the memory buffer identified by the addresses for inconsistencies that indicate corruption. A determination of whether the software objects are corrupted is made based on the outcome of the tests. If software object corruption is detected, proper corrective actions are applied to prevent malicious exploitation of the corruption.

16 Claims, 5 Drawing Sheets

SOFTWARE OBJECT CORRUPTION DETECTION

BACKGROUND

1. Field of Disclosure

The disclosure generally relates to the field of computer security, in particular to detecting computer memory corruption.

2. Description of the Related Art

A wide variety of malicious software (malware) can attack modern computers. Malware threats include computer viruses, worms, Trojan horse programs, spyware, adware, crimeware, and phishing websites. Malicious entities sometimes attack servers that store sensitive or confidential data that can be used to the malicious entity's own advantage. Similarly, other computers, including home computers, must be constantly protected from malicious software that can be transmitted when a user communicates with others via electronic mail, when a user downloads new programs or program updates, and in many other situations. The different options and methods available to malicious entities for attack on a computer are numerous.

Conventional techniques for detecting malware, such as signature string scanning, are becoming less effective. Modern malware is often targeted and delivered to only a relative handful of computers. For example, a Trojan horse program can be designed to target computers in a particular department of a particular enterprise. Such malware might never be encountered by security analysts, and thus the security software might never be configured with signatures for detecting such malware. Mass-distributed malware, in turn, can contain polymorphisms that make every instance of the malware unique. As a result, it is difficult to develop signature strings that reliably detect all instances of the malware.

Newer techniques for detecting malware involve the use of reputation systems. A reputation system can determine the reputation of a file encountered on a computer in order to assess the likelihood that the file is malware. One way to develop the reputation for a file is to monitor its runtime activities and base the reputation on such activities. However, instead of carrying out suspicious activities itself, malware may exploit vulnerabilities of a legitimate application and direct the legitimate application to carry out such activities. For example, malicious web content may exploit vulnerabilities in web browsers (or browser plug-ins) to install malicious software on computer systems. Accordingly, there is a need for techniques that can detect whether legitimate applications have been exploited by malware.

SUMMARY

Embodiments of the present disclosure include methods (and corresponding systems and computer program products) for detecting software object corruption in a running software application.

One aspect of the present disclosure is a computer-implemented method for detecting software object corruption, comprising: identifying a pointer of a software object created by a running software application, a value of the pointer comprising an address of a virtual method table that comprises addresses of methods associated with the software object; examining the value of the pointer and the addresses in the virtual method table to determine whether the software object is corrupted; and responsive to a determination that the software object is corrupted, applying a corrective action.

Another aspect of the present disclosure is a computer system for detecting software object corruption, comprising: a non-transitory computer-readable storage medium storing executable computer program code, the computer program code comprising program code for: identifying a pointer of a software object created by a running software application, a value of the pointer comprising an address of a virtual method table that comprises addresses of methods associated with the software object; examining the value of the pointer and the addresses in the virtual method table to determine whether the software object is corrupted; and responsive to a determination that the software object is corrupted, applying a corrective action.

Still another aspect of the present disclosure is a non-transitory computer-readable storage medium encoded with executable computer program code for detecting software object corruption, the computer program code comprising program code for: identifying a pointer of a software object created by a running software application, a value of the pointer comprising an address of a virtual method table that comprises addresses of methods associated with the software object; examining the value of the pointer and the addresses in the virtual method table to determine whether the software object is corrupted; and responsive to a determination that the software object is corrupted, applying a corrective action.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

Figure (FIG.) 1 is a high-level block diagram of a computing environment according to one embodiment of the present disclosure.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
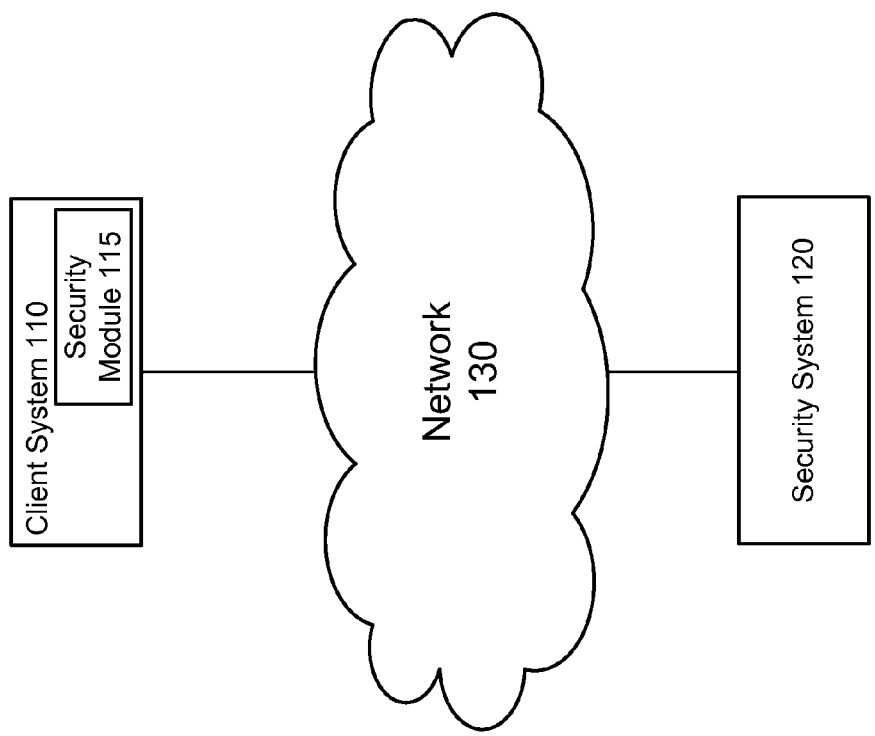

FIG. 1 is a high-level block diagram that illustrates a computing environment 100 for detecting software object corruption and preventing malicious exploitation of such corruption, according to one embodiment of the present disclosure. Software applications developed using the object oriented programming paradigm use software objects (also called "objects" herein) to store data and implement functionalities. These objects are created and stored in memory buffers allocated for the corresponding software applications. If the memory allocated for a software object is compromised, the corresponding software application may become vulnerable to malicious exploitation.

As shown, the computing environment 100 includes a client system 110 and a security system 120 connected through a network 130. Only one of each entity is illustrated in order to simplify and clarify the present description. There can be other entities in the computing environment 100 as well.

The client system 110 is an electronic device that can host malicious software. In one embodiment, the client system 110 is a conventional computer system executing, for example, a Microsoft Windows-compatible operating system (OS), Apple OS X, and/or a Linux distribution. In another embodiment, the client system 110 is another device having computer functionality, such as a personal digital assistant (PDA), mobile telephone, video game system, etc. The client system 110 typically stores numerous computer files that can host malicious software. Malicious software (or content) may also be temporarily transmitted over the network 130 to the client system 110 to be executed or processed on the client system 110.

Malicious software, sometimes called "malware," is generally defined as software that executes on the client system 110 surreptitiously or that has some surreptitious functionality. Malware can take many forms, such as parasitic viruses that attach to legitimate files, worms that exploit weaknesses in the computer's security in order to infect the computer and spread to other computers, Trojan horse programs that appear legitimate but actually contain hidden malicious code, and spyware that monitors keystrokes and/or other actions on the computer in order to capture sensitive information or display advertisements. Malicious content (also called malicious programmatic content) may be inserted into scripting code such as JavaScript code, VBScript code, Flash code, Portable Document Format (PDF) code, PostScript code, to name a few. These malicious code can be interpreted by a running software (or application, module, plug-in) such as a web browser and a specialized document rendering application (e.g., Adobe Reader), and carry out malicious activities by exploiting vulnerabilities in such software. Other examples of the running software include HTML control, Adobe Reader control, and Scripting host, to name a few.

The client system 110 executes a security module 115 for detecting software object corruption in software applications running on the client system 110 and preventing malicious exploitation of such corruption. The security module 115 can be, for example, incorporated into the OS of the computer or part of a separate comprehensive security package, or loaded directly into a running program via programmatic extensions such as a plug-in or a control module. In one embodiment, the security module 115 is provided by the entity that operates the security system 120. The security module 115 can communicate with the security system 120 via the network 130 for classification logic (e.g., a set of tests, a decision tree) for determining whether a software object is corrupted.

The security module 115 detects software object corruption in software applications running on the client system 110, and applies corrective actions as needed. The security module 115 inspects pointers of software objects used by a running software application and associated memory content. A pointer is a data type whose value refers directly to (or "points to") another value (e.g., data or instruction) stored elsewhere in the computer memory using its address. The computer memory address a pointer refers to is called the value of the pointer or the pointer value. Examples of such pointers include pointers pointing to virtual method tables (hereinafter called the v-tables) of the objects, and pointers in the v-tables pointing to the memory locations where instructions of the corresponding subroutines are stored. A subroutine (hereinafter called a method, a function, a procedure) is a set of instructions that collectively perform a specific task and are relatively independent of other instructions in the same software application. The security module 115 determines whether a software object is corrupted by inspecting its pointer pointing to the v-table (hereinafter called the v-table pointer), the v-table itself (e.g., addresses or pointers in the v-table), and associated memory content using a set of tests. In one embodiment, the tests are integrated into a decision tree (e.g., as splitting tests of branch nodes), and the security module 115 classifies a software object as being corrupted or correct by traversing the decision tree.

The security system 120 is a hardware device and/or software program configured to provide logic (e.g., a set of tests, a decision tree) for detecting software object corruption to the client systems 110. An example of the security system 120 is a web-based system providing security software and services allowing the security module 115 to detect software object corruption and prevent malicious exploitation of such corruption in the client systems 110. The tests can be manually deduced by computer security experts based on observed exploitations of corrupted software objects, or automatically generated by a machine learning engine by applying a decision tree induction algorithm to information about the observed exploitations. Examples of the tests are provided and described in detail below with regard to FIG. 3.

The network 130 enables communications between the client system 110 and the security system 120. In one embodiment, the network 130 uses standard communications technologies and/or protocols. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), JavaScript, VBScript, Flash, PDF, PostScript, etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 130 can also include links to other networks such as the Internet.

Computer Architecture

Figure 2:
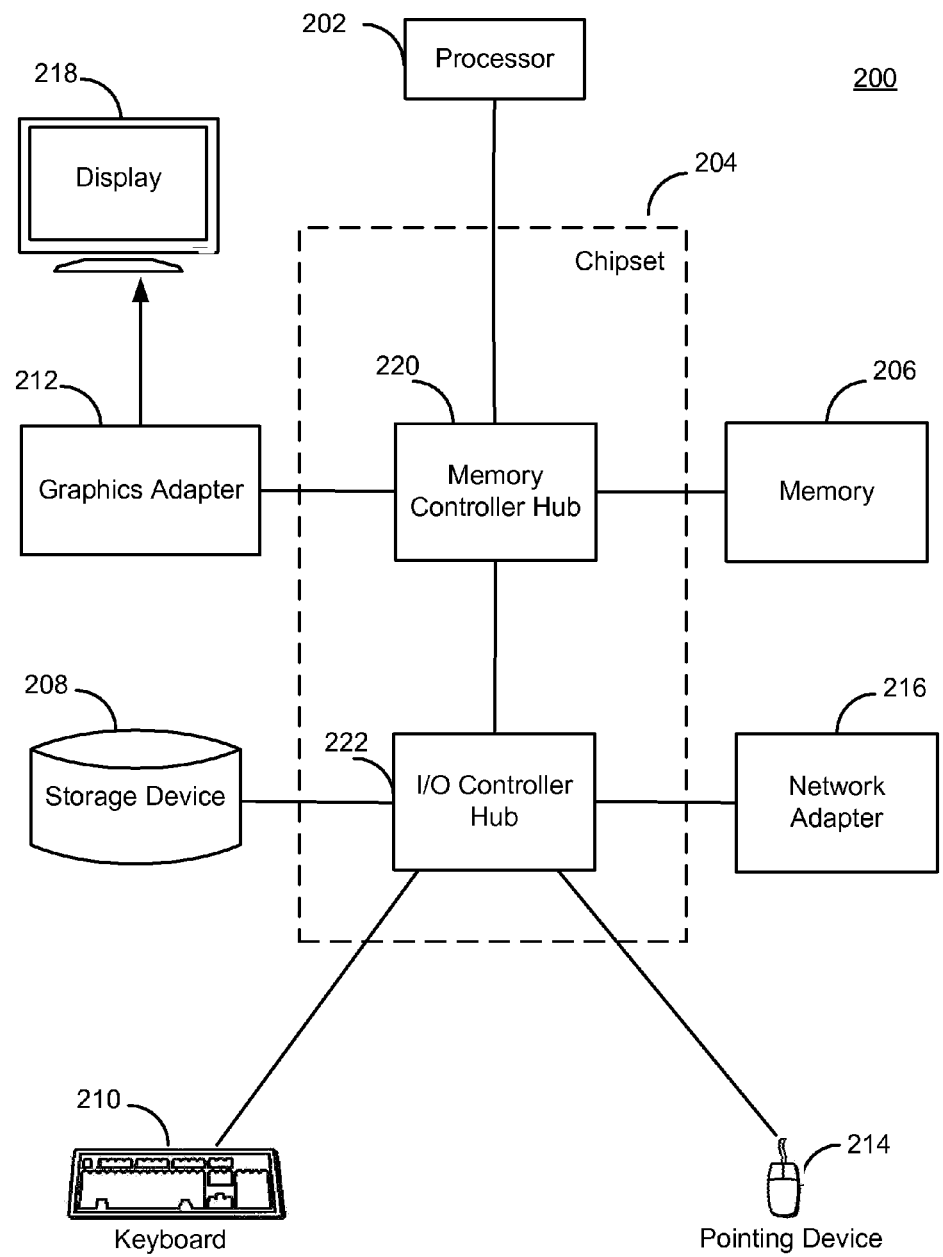
FIG. 2 is a high-level block diagram illustrating an example of a computer for use in the computing environment shown in FIG. 1 according to one embodiment of the present disclosure.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

Figure 3:
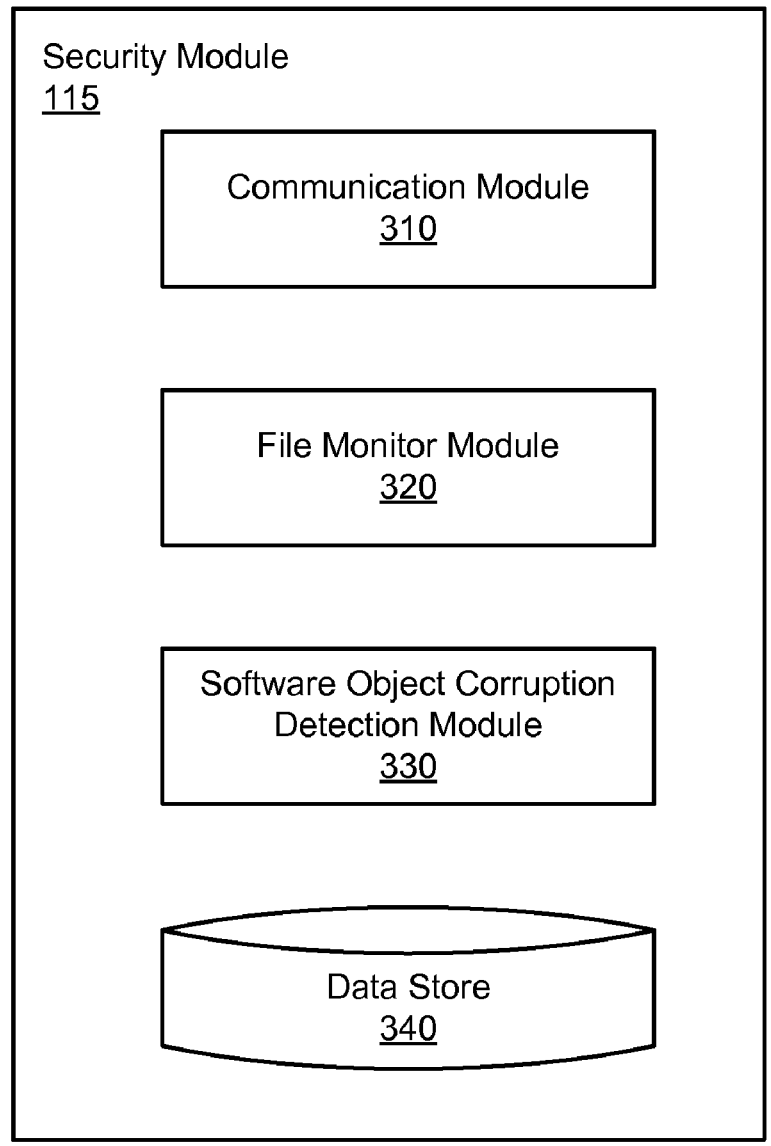
FIG. 3 is a high-level block diagram illustrating modules within a security module according to one embodiment of the present disclosure.

The types of computers 200 used by the entities of FIG. 1 can vary depending upon the embodiment and the processing power required by the entity. For example, the security system 120 might comprise multiple blade servers working together to provide the functionality described herein. As another example, the client system 110 might comprise a mobile telephone with limited processing power. The computers 200 can lack some of the components described above, such as keyboards 210, graphics adapters 212, and displays 218.
Example Architectural Overview of the Security Module FIG. 3 is a high-level block diagram illustrating a detailed view of modules within the security module 115 according to one embodiment. Some embodiments of the security module 115 have different and/or other modules than the ones described herein. Similarly, the functions can be distributed among the modules in accordance with other embodiments in a different manner than is described here. As illustrated, the security module 115 includes a communication module 310, an application monitor module 320, a software object corruption detection engine 330, and a data store 340.

The communication module 310 communicates with the security system 120 to request and receive tests for detecting software object corruption. The tests can be received in a variety of forms, such as a set of if-then-else statements, a decision tree, a computer program module implementing the tests, textual description of the tests in an XML file, or any ASCII file format.

The application monitor module 320 monitors software applications running on the client system 110, and diverts the execution of the software applications to detect software object corruption. In one embodiment, the application monitor module 320 examines a software application (e.g., by matching specific bit patterns in memory, examining specific addresses in the process memory space, or searching for particular types of instructions such as jump commands) to identify execution points (e.g., instructions) at which to interrupt the execution to detect software object corruption. The execution points can be identified using identification information (e.g., instruction addresses in executable images) provided by the security system 120 along with the classification logic. In another embodiment, the application monitor module 320 interrupts the execution of a software application at predefined intervals (e.g., every minute) or events (e.g., when the application attempts to transmit data over the network 130), or prior to using a software object. The application monitor module 320 may also accomplish execution diversion programmatically using Application Programming Interface (API) or interfaces implemented by the monitored program or the operating system which allow the security module 115 to register "callback" routines.

The application monitor module 320 diverts the execution of a software application by replacing the instructions at the identified execution points with instructions (e.g., jump commands) redirecting the execution to the software object corruption detection engine 330 (or instructions provided by the detection engine 330) such that the detection engine 330 can access the memory buffers of the software application and detect software object corruption before the software application executes further. The monitor module 320 can replace (or insert) the instructions before or during execution of the software application.

The software object corruption detection engine 330 detects software object corruption in a software application by inspecting pointers associated with software objects used in the software application. Examples of the inspected pointers include the v-table pointer and pointers (or addresses) in the v-table. In one embodiment, the execution of the software application is diverted to the detection engine 330 (e.g., through a jump command placed in the software application by the monitor module 320). The detection engine 330 analyzes the execution environment of the software application (e.g., content of the allocated stacks, heaps) to identify one or more software objects used by the software application. For example, a pointer pointing to a current software object is typically located at the top of the call stack, and the v-table pointer of a software object is typically located at the beginning of the object. Thus, the detection engine 330 can locate the current software object, its v-table pointer, and pointers to its virtual methods.

The detection engine 330 inspects the integrity of the pointers by applying a set of tests. The tests inspects the pointer values, properties of the memory buffer the pointers point to, and/or content of the memory buffer for inconsistencies that are evidence of corruption.

Some of the tests inspect the pointer values for evidence of corruption. For example, one of the tests examines the v-table pointer and/or pointers in the v-table for invalid pointer values (e.g., a NULL pointer value). Because the v-table pointer and pointers in the v-table for a valid software object should never be a NULL pointer, the presence of such a pointer suggests that the software object is corrupted. As another example, a test examines the pointer values to detect the presence of suspicious bit patterns indicating heap spray, such as symmetric bit patterns (e.g., 0C0C0C0C, 0C0D0C0D). Because pointer values are typically allocated at runtime based on current computer system memory usage status, the pointer values typically appear random and rarely exhibit a symmetric bit pattern. Thus, if any of the pointer values exhibits such a pattern, it is likely that the memory buffer including the pointer is corrupted (e.g., overwritten by a malware using techniques such as heap spraying). Still another example test examines the pointer values to determine if the pointer values are interpreted as instructions (e.g., machine code), whether there are repeated (or multiple) No Operation Performed (NOP) instructions (e.g., an instruction that does nothing) or equivalent instructions. Because malware typically sprays NOP instructions in a memory buffer, if a pointer value when interpreted as instructions includes repeated NOP instructions, it is likely that the software object is corrupted.

Some of the tests examine the logical consistency of the pointer values for evidence of corruption. For example, one such test examines the pointers in the v-table to make sure that their values are not the same as the memory address of the v-table itself. Since pointers in a v-table should points to the instructions of the virtual methods, the fact that one such pointer points to the v-table itself suggests that the software object is corrupted. Another example test examines the pointer values for duplications. Because the v-table pointer points to the v-table and the pointers in the v-table point to different virtual methods of the associated software objects, these pointers should point to different memory locations. Thus, the presence of pointer value duplication indicates that the software object is likely corrupted.

Some of the tests examine the target memory of the pointers for inconsistencies that indicate corruption. For example, a test examines the label (or attribute) of the memory segment including the memory address of a pointer for inconsistency. When a compiler generates an executable software application, the compiler typically labels the segment in which the executable instructions reside as an executable segment. If a pointer in the v-table points a non-executable memory region, a non-memory mapped image section (or region), a heap, a stack, or a static data section, then it is likely that the software object is corrupted. Another example test examines the pointer values to determine whether they are within a predictable range. If a pointer value is below a process base address of the memory buffer(s) allocated for the software application, or falls into the memory region(s) known to be reserved for the system and only accessible by kernel code, it is also likely that the software object is corrupted, since normally the v-table pointer and pointers within the v-table would not point to such memory regions. Still another example test examines the content stored at the memory region(s) referred by the pointers for inconsistency. For example, if the memory content contains repeated NOP instructions or suspicious bit patterns, it is likely that the memory content is contaminated (e.g., sprayed by malware), and the software object is corrupted. Typically a software application would not exhibit repeated NOP instructions or suspicious bit patterns in its instructions.

The detection engine 330 determines whether a software object is corrupted based on the result of applying one or more such tests. If no corruption is detected, the detection engine 330 resumes the execution of the software application by passing the control back to the software application (e.g., through another jump command). Otherwise, the detection engine 330 applies one or more appropriate corrective actions, such as performing a countermeasure, terminating the software application, generating a warning message, terminating another software application that may have caused the corruption, and/or cleaning (or correcting) the corrupted memory buffer. Additionally (or alternatively), the detection engine 330 may return an error code indicating that the requested action failed, and/or that the execution of the current routine should be aborted.

The data store 340 stores data used by the client system 110. Examples of such data include information related to the computer files residing on the client system 110 (e.g., tests for detecting software object corruption), results of previously detected software object corruption, and information about the security system 120 (e.g., the IP address). The data store 340 may be a relational database or any other type of database.

Overview of Methodology for the Security Module

Figure 4:
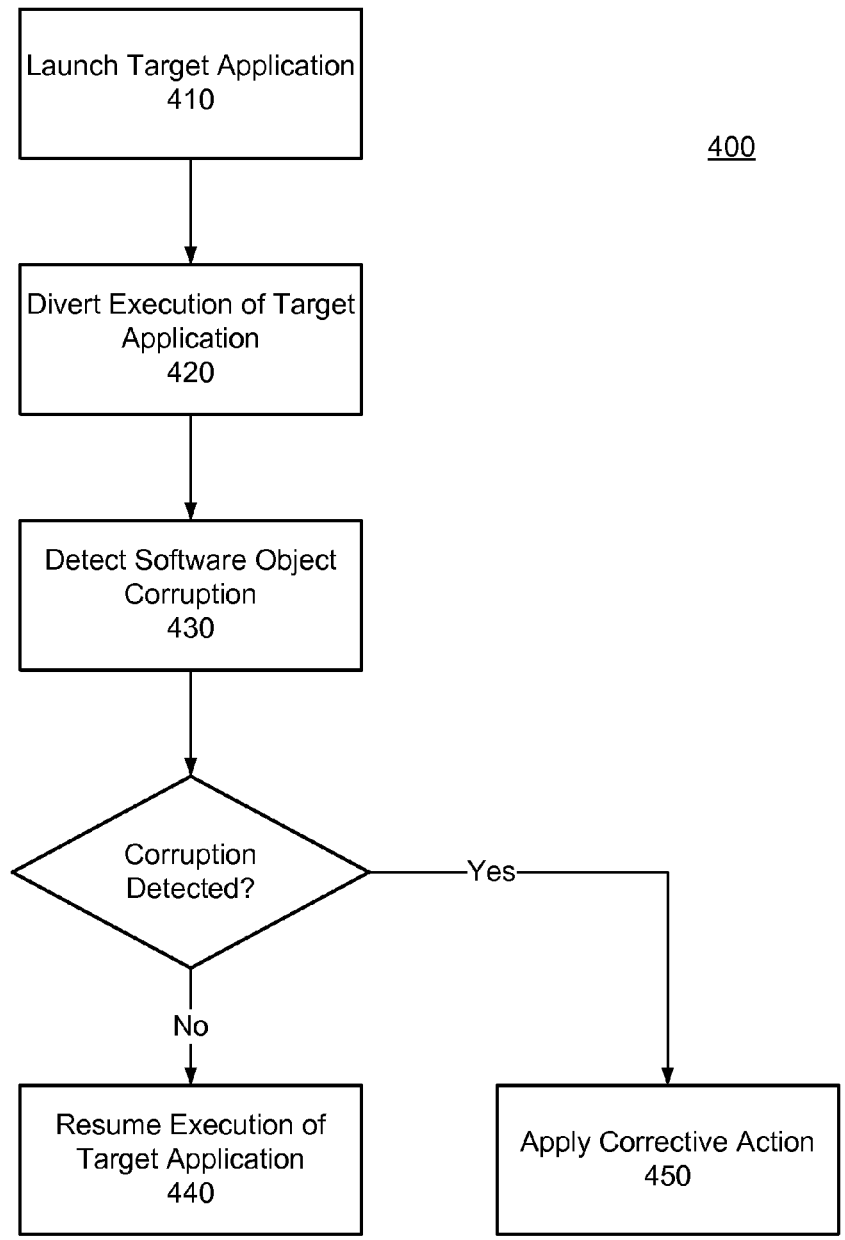
FIGS. 4 and 5 are flow diagrams collectively illustrating a process for detecting software object corruption in a running software application according to one embodiment of the present disclosure.

FIG. 4 is a flow diagram illustrating a process 400 for the security module 115 to detect software object corruption in a running software application, according to one embodiment. Other embodiments can include different and/or additional steps than the ones described herein.

The client system 110 launches 410 a target software application. The security module 115 monitors the execution of the target application and diverts 420 the execution to the detection engine 330. In one embodiment, the security module 115 identifies one or more execution points in the target software application, and replaces instructions at the identified execution points with redirection instructions that pass control to the detection engine 330. In addition to (or instead of) replacing instructions, the security module 115 may register a callback routine that passes control to the detection engine 330 with the operating system or the executing process. Once the detection engine 330 obtains control, it examines the execution environment of the target application, and detects 430 software object corruption by inspecting pointers of the software objects used by the target application. Examples of the pointers are the v-table pointer and pointers in the v-table. The detection step 430 is illustrated in FIG. 5 and described in detail below.

Figure 5:
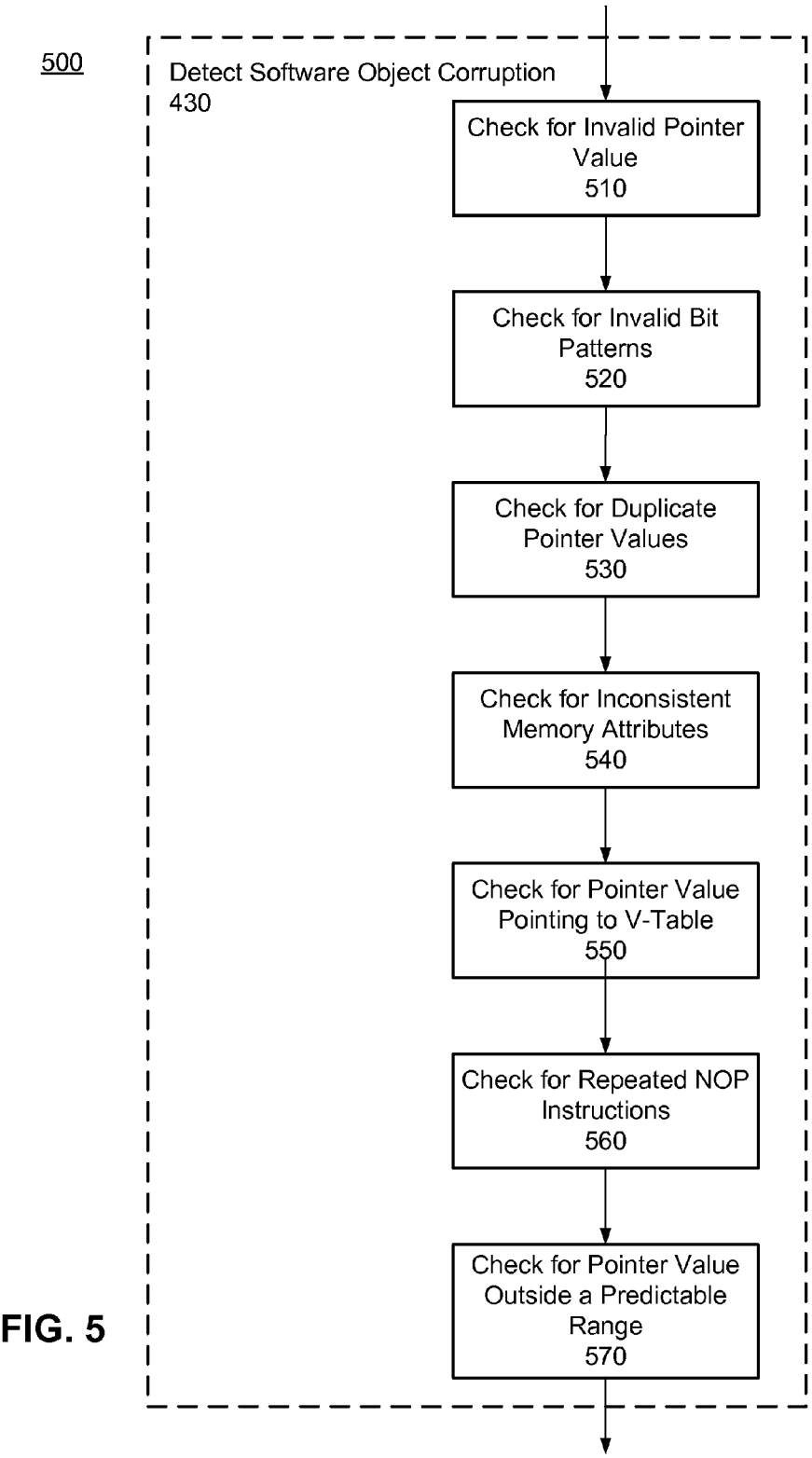

Referring now to FIG. 5, a flow diagram illustrating a process 500 for the detection engine 330 to detect software object corruption, according to one embodiment. Other embodiments can include different and/or additional steps than the ones described herein at different sequences. As shown, the detection engine 330 first checks 510 the pointers for invalid pointer values such as the NULL pointer value. The detection engine 330 then checks 520 for invalid bit patterns in the pointer values and/or content in the memory referred by the pointers, checks 530 for duplicate pointer values, checks 540 for pointer values pointing to memory regions with inconsistent memory attributes, checks 550 for pointer in the v-table pointing to the address of the v-table, checks 560 for repeated NOP instructions in the pointer values and/or content in the memory referred by the pointers, and checks 570 for pointer values outside a predictable range.

Referring back to FIG. 4, the security module 115 determines whether a software object is corrupted based on the result of the process 500. It is noted that not all tests illustrated in FIG. 5 are necessary to be applied, and the security module 115 may make the determination based on outcomes of one or more such tests. If no software object corruption is detected, the security module 115 resumes 440 the execution of the target application by passing the control back to the target application (e.g., through a jump command). Otherwise, if one or more software object corruption is detected, the security module 115 applies 450 an appropriate corrective action, such as terminating the software application, generating a warning message, correcting the corrupted memory buffer, and/or returning an error code indicating that the operation has failed.

The security module 115 may periodically interrupt the execution of the target application to detect software object corruption (e.g., at predefined intervals or events, or prior to using certain software objects). As a result, the security module 115 can timely detect software object corruption and implement corrective actions, thereby preventing malicious exploitation of such corruption.

Additional Embodiments

In one embodiment, instead of (or in addition to) replacing or inserting redirection instructions to a software application while the software application is in execution, the security module 115 can replace or add in the redirection instructions before the software application runs. In addition, the described technique can be used for other purposes such as debugging and memory integrity validation, and the redirection instructions (or the detection instructions) can be integrated into the software application during compilation.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for detecting software object corruption. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method of a security module of a computer system detecting software object corruption of legitimate software applications, comprising:

monitoring an execution of a legitimate software application launched by the computer system;

diverting the execution of the legitimate software application to the security module responsive to monitoring the execution of the legitimate software application;

identifying a pointer of a software object created by the legitimate software application, a value of the pointer comprising an address of a virtual method table that comprises addresses of methods associated with the software object;

examining the value of the pointer and the addresses in the virtual method table, wherein the examination comprises at least one of:

determining whether the value of the pointer or an address in the virtual method table comprises a NULL pointer value; and determining whether the value of the pointer, the address in the virtual method table, or data stored at the addresses in the virtual method table comprises a bit pattern indicating heap spray;

determining that the software object is corrupted responsive to a determination that the value of the pointer or the address in the virtual method table comprises the NULL pointer value or responsive to a determination that the value of the pointer, the address in the virtual method table, or the data stored at the addresses in the virtual method table comprises the bit pattern indicating heap spray; and responsive to the determination that the software object created by the legitimate software application is corrupted, applying a corrective action.

2. The method of claim 1, further comprising:

determining whether the value of the pointer or an address in the virtual method table comprise duplicate values; and determining that the software object is corrupted responsive to a determination that the value of the pointer or an address in the virtual method table comprise duplicate values.

3. The method of claim 1, further comprising:

determining whether a memory buffer associated with one or more of the addresses in the virtual method table has a memory attribute indicating that the memory buffer comprises non-executable memory; and determining that the software object is corrupted responsive to a determination that a memory buffer associated with one or more of the addresses in the virtual method table has a memory attribute indicating that the memory buffer comprises non-executable memory.

4. The method of claim 1, further comprising:

determining whether the addresses in the virtual method table comprise a memory address of the virtual method table; and determining that the software object is corrupted responsive to a determination that the addresses in the virtual method table comprise the memory address of the virtual method table.

5. The method of claim 1, further comprising:

determining whether the value of the pointer, the addresses in the virtual method table, or data stored at the addresses, when interpreted as machine code, comprise multiple NOP instructions; and determining that the software object is corrupted responsive to a determination that the value of the pointer, the addresses in the virtual method table, or the data stored at the addresses, when interpreted as machine code, comprise multiple NOP instructions.

6. The method of claim 1, further comprising:

determining whether the addresses in the virtual method table comprise an address outside a predicable range; and determining that the software object is corrupted responsive to a determination that the addresses in the virtual method table comprise an address outside the predictable range.

7. A computer system for detecting software object corruption of legitimate software applications, comprising:

a non-transitory computer-readable storage medium storing executable computer program code for a security module, the security module configured for:

monitoring an execution of a legitimate software application launched by the computer system;

diverting the execution of the legitimate software application to the security module responsive to monitoring the execution of the legitimate software application;

identifying a pointer of a software object created by the legitimate software application, a value of the pointer comprising an address of a virtual method table that comprises addresses of methods associated with the software object;

examining the value of the pointer and the addresses in the virtual method table, wherein the examination comprises at least one of:

determining whether the value of the pointer or an address in the virtual method table comprises a NULL pointer value; and determining whether the value of the pointer, the address in the virtual method table, or data stored at the addresses in the virtual method table comprises a bit pattern indicating heap spray;

determining that the software object is corrupted responsive to a determination that the value of the pointer or the address in the virtual method table comprises the NULL pointer value or responsive to a determination that the value of the pointer, the address in the virtual method table, or the data stored at the addresses in the virtual method table comprises the bit pattern indicating heap spray; and responsive to the determination that the software object created by the legitimate software application is corrupted, applying a corrective action.

8. The computer system of claim 7, wherein the security module is further configured for:

determining whether the value of the pointer or an address in the virtual method table comprise duplicate values; and determining that the software object is corrupted responsive to a determination that the value of the pointer or an address in the virtual method table comprise duplicate values.

9. The computer system of claim 7, wherein the security module is further configured for:

determining whether a memory buffer associated with one or more of the addresses in the virtual method table has a memory attribute indicating that the memory buffer comprises non-executable memory; and determining that the software object is corrupted responsive to a determination that a memory buffer associated with one or more of the addresses in the virtual method table has a memory attribute indicating that the memory buffer comprises non-executable memory.

10. The computer system of claim 7, wherein the security module is further configured for:

determining whether the addresses in the virtual method table comprise a memory address of the virtual method table; and determining that the software object is corrupted responsive to a determination that the addresses in the virtual method table comprise the memory address of the virtual method table.

11. The computer system of claim 7, wherein the security module is further configured for:

determining whether the value of the pointer, the addresses in the virtual method table, or data stored at the addresses, when interpreted as machine code, comprise multiple NOP instructions; and determining that the software object is corrupted responsive to a determination that the value of the pointer, the addresses in the virtual method table, or the data stored at the addresses, when interpreted as machine code, comprise multiple NOP instructions.

12. The computer system of claim 7, wherein the security module is further configured for:

determining whether the addresses in the virtual method table comprise an address outside a predicable range; and determining that the software object is corrupted responsive to a determination that the addresses in the virtual method table comprise an address outside the predictable range.

13. A non-transitory computer-readable storage medium encoded with executable computer program code for a security module of a computer system for detecting software object corruption of legitimate software applications, the computer program code comprising program code for:

monitoring an execution of a legitimate software application launched by the computer system;

diverting the execution of the legitimate software application to the security module responsive to monitoring the execution of the legitimate software application;

identifying a pointer of a software object created by the legitimate software application, a value of the pointer comprising an address of a virtual method table that comprises addresses of methods associated with the software object;

examining the value of the pointer and the addresses in the virtual method table, wherein the examination comprises at least one of:

determining whether the value of the pointer or an address in the virtual method table comprises a NULL pointer value; and determining whether the value of the pointer, the address in the virtual method table, or data stored at the addresses in the virtual method table comprises a bit pattern indicating heap spray;

determining that the software object is corrupted responsive to a determination that the value of the pointer or the address in the virtual method table comprises the NULL pointer value or responsive to a determination that the value of the pointer, the address in the virtual method table, or the data stored at the addresses in the virtual method table comprises the bit pattern indicating heap spray; and responsive to a determination that the software object created by the legitimate software application is corrupted, applying a corrective action.

14. The non-transitory computer-readable storage medium of claim 13, the program code further for:
   determining whether the value of the pointer or an address in the virtual method table comprise duplicate values; and
   determining that the software object is corrupted responsive to a determination that the value of the pointer or an address in the virtual method table comprise duplicate values.

15. The computer-implemented method of claim 1, wherein diverting the execution of the legitimate software application to the security module comprises:
   identifying execution points at which to interrupt the execution of the legitimate software application; and
   replacing instructions at the identified execution points with redirection instructions to pass control of the legitimate software application to the security module.

16. The computer-implemented method of claim 15, wherein identifying the execution points is based on identification information provided by a remote security system.

* * * * *

UNITED STATES PATENT AND TRADEMARK OFFICE
CERTIFICATE OF CORRECTION

PATENT NO. : 8,307,435 B1
APPLICATION NO. : 12/707970
DATED : November 6, 2012
INVENTOR(S) : Uriel Mann and Nishant Doshi It is certified that error appears in the above-identified patent and that said Letters Patent is hereby corrected as shown below:

In the Claims:

In claim 6 at column 11, line 10, delete "predicable" and insert --predictable--.

In claim 12 at column 12, line 29, delete "predicable" and insert --predictable--.

Signed and Sealed this
Seventeenth Day of September, 2013

Teresa Stanek Rea
*Deputy Director of the United States Patent and Trademark Office*